Figure 1:
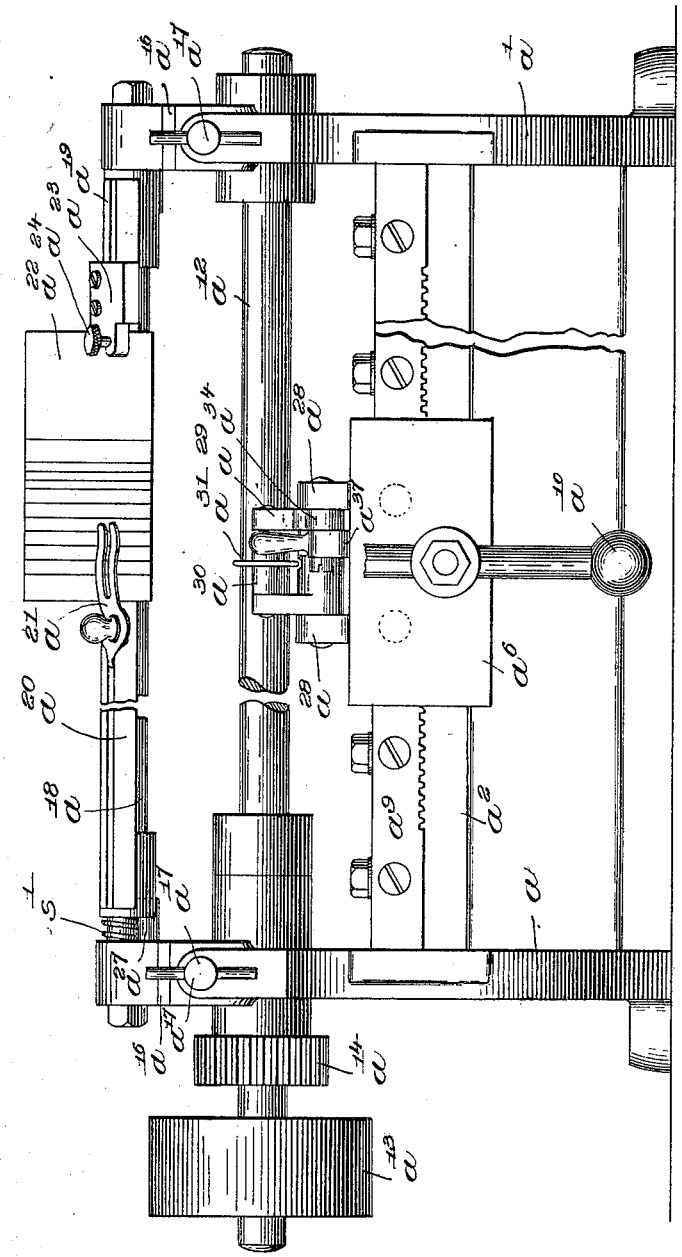

No. 672,527. Patented Apr. 23, 1901.
D. E. HUNTER.
MACHINE FOR SPACING ADJUSTABLE RULING SPINDLES.
(Application filed July 5, 1900.)
(No Model.) 3 Sheets—Sheet 1.

No. 672,527. Patented Apr. 23, 1901.
D. E. HUNTER.
MACHINE FOR SPACING ADJUSTABLE RULING SPINDLES.
(Application filed July 5, 1900.)
(No Model.) 3 Sheets—Sheet 2.

Witnesses:
Thomas J. Drummond
Fred S. Greenleaf

Inventor:
David E. Hunter
By Crosby & Gregory
attys.

No. 672,527. Patented Apr. 23, 1901.
D. E. HUNTER.
MACHINE FOR SPACING ADJUSTABLE RULING SPINDLES.
(Application filed July 5, 1900.)
(No Model.) 3 Sheets—Sheet 3.
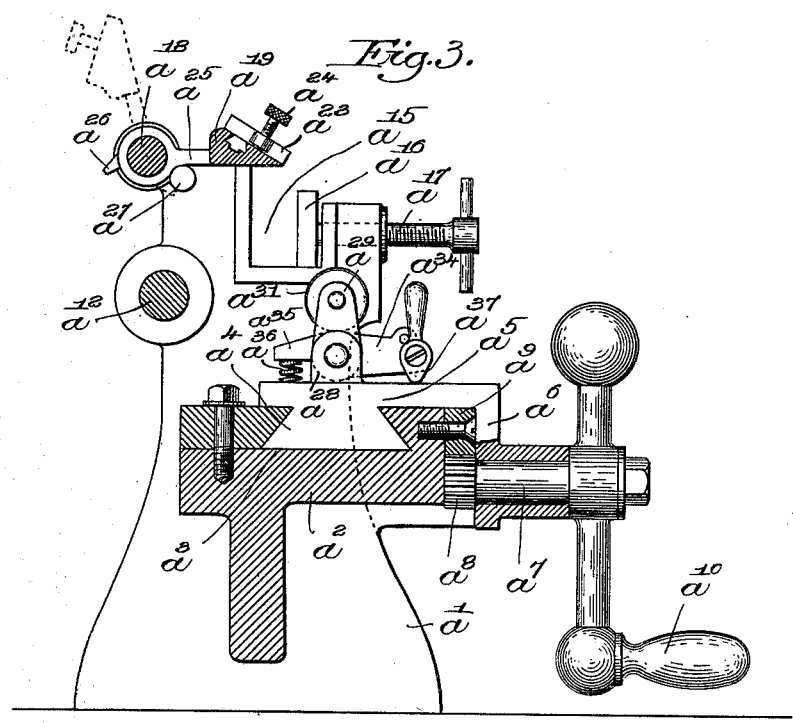
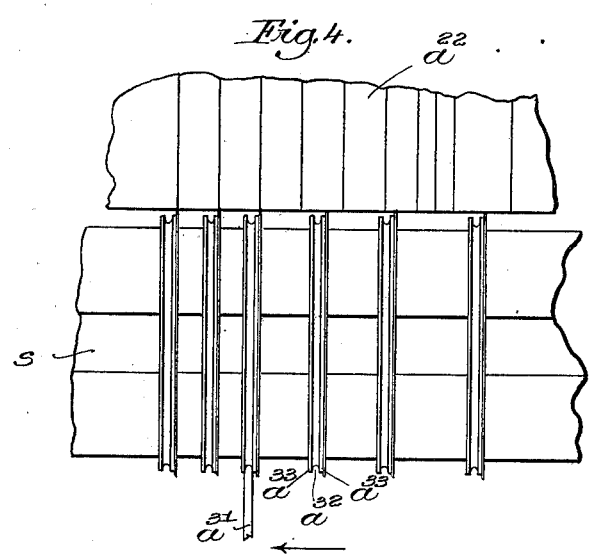
Witnesses:
Thomas J. Drummond
Fred S. Greenleaf
Inventor:
David E. Hunter
By Crosby & Gregory.
Attys.
THE NORRIS PETERS CO., PHOTO-LITHO., WASHINGTON, D. C.

UNITED STATES PATENT OFFICE.

DAVID E. HUNTER, OF CAMBRIDGE, MASSACHUSETTS, ASSIGNOR TO LIBRARY BUREAU, OF BOSTON, MASSACHUSETTS.

MACHINE FOR SPACING ADJUSTABLE RULING-SPINDLES.

SPECIFICATION forming part of Letters Patent No. 672,527, dated April 23, 1901.

Application filed July 5, 1900. Serial No. 22,537. (No model.)

*To all whom it may concern:*

Be it known that I, DAVID E. HUNTER, a citizen of the United States, and a resident of Cambridge, county of Middlesex, State of Massachusetts, have invented an Improvement in Machines for Spacing Adjustable Ruling-Spindles, of which the following description, in connection with the accompanying drawings, is a specification, like letters on the drawings representing like parts.

As fully stated in my companion application, Serial No. 22,538, a ruling-spindle provided with adjustable rulers or ruling devices has long been desired for use in printing-offices, paper-ruling establishments, and card, catalogue, and index manufactories, &c., and I have finally succeeded, as fully explained in my said application, in providing a practical spindle for this purpose without requiring any spacing devices or separators or complicated mechanism, and the present application is for the machine for adjusting or spacing said spindles. As will be readily appreciated without elaborate explanation of the reasons therefor, it is imperative in devices of this kind that the rulers or ruling devices shall be adjusted with absolute precision, so that the lines ruled thereby shall not only be spaced apart exactly as desired to the smallest fraction of an inch, but also the ruling-rings must be adjusted absolutely perpendicularly to the axis of the spindle in order that the lines when ruled thereby shall be absolutely even and straight, as it will be understood that if said rings vary the slightest the lines would be correspondingly wavy or irregular.

Stated in general terms, my machine comprises means for holding the spindle whose marking-rings are to be adjusted, an adjusting device, and mechanism for relatively moving said adjusting device and spindle so as to bring the rings into the desired adjustment.

Further details of construction and full explanation of my invention will be given in the following description, reference being had to the accompanying drawings, in which I have illustrated the form of mechanism in which I at present prefer to embody my invention.

Figure 2:
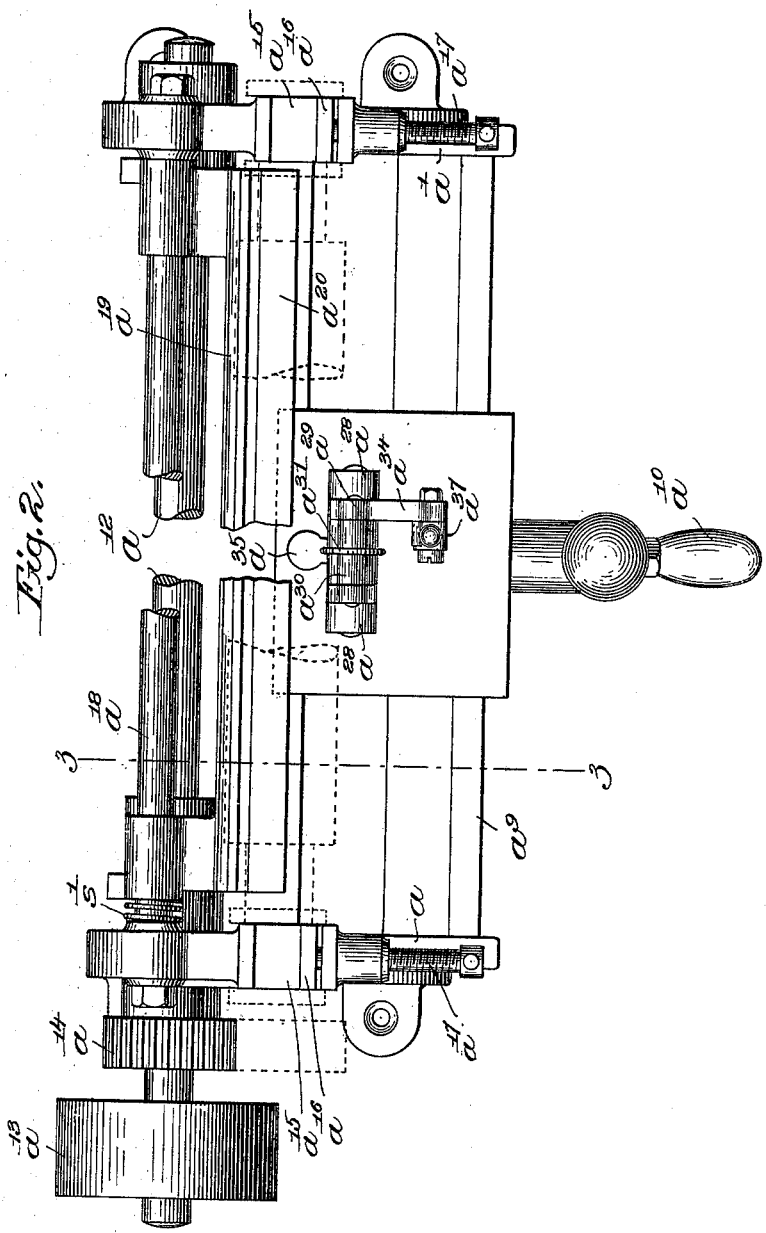

In the drawings, Figure 1 is a front elevation, partly broken away, showing the preferred form of my machine. Fig. 2 is a top plan view thereof, also foreshortened or broken out and showing in dotted lines a ruling-spindle in position. Fig. 3 is a central vertical transverse section taken on the line 3 3, Fig. 2. Fig. 4 is an enlarged detail in plan illustrating the operation of my invention.

The framework of the machine and many details of the arrangement thereof may be of any form desired or suitable and is herein shown as comprising end supports $a$ $a'$, joined by a heavy bed-plate $a^2$. The bed-plate $a^2$ has in its upper side a guide or slide way $a^3$ for a dovetailed projection $a^4$ of a traveling adjuster or support $a^5$ for the spacing mechanism, this support $a^5$ being shown as provided with an overhanging arm $a^6$, in the lower end of which is journaled a stud $a^7$, carrying a pinion $a^8$, in mesh with a rack $a^9$, fixed to the bed $a^2$, said pinion and stud being operated by a suitable handle $a^{10}$.

Mounted in the ends of the machine parallel to the guideway $a^3$ is an operating-shaft $a^{12}$, provided at one end with a pulley $a^{13}$ to receive power from any suitable belt and adjacent thereto with a gear $a^{14}$, corresponding in pitch to the gears carried by the spindles whose marking-rings are to be spaced.

In proper alinement with the guideway $a^3$ and shaft $a^{12}$, and herein shown as formed in the ends of the frame, are sockets or recesses $a^{15}$ to receive the journal-bearings of the spindle, one of the latter being shown in the illustrative Fig. 4 and designated $s$, although for the details thereof I refer to my before-mentioned application. This recess is provided with suitable holding mechanism, shown as a block $a^{16}$ and tightening screw or bolt $a^{17}$.

Above the parts mentioned is a rod or shaft $a^{18}$, journaled in the ends of the frame, which supports a pattern-holder, shown as comprising a bar $a^{19}$, having a beveled or downwardly-inclined face $a^{20}$, on which is adjustably mounted a spring-clamp $a^{21}$ to engage a pattern, card, or sample $a^{22}$ which is to be duplicated, and at the other end the bar $a^{19}$ carries a stationary clamp $a^{23}$, whose set-screw $a^{24}$ serves to maintain the card $a^{22}$ in immovable position. This clamp $a^{23}$ is set or placed to correspond with the ruling-machine in which the ruling-spindles are used, the entire holder being held snugly to the right of the machine, viewing Fig. 1, by a spring $s'$. The bar $a^{19}$ is supported at its ends by arms $a^{25}$, preferably pivoted on the rod $a^{18}$ and having stops $a^{26}$ to engage lugs $a^{27}$ at the ends of the machine, thereby permitting the pattern-holder to be swung over into its dotted-line position, Fig. 3, when it is desired to place or remove a spindle in or from the machine. On the slide or support $a^5$ is pivoted in suitble ears $a^{28}$ a carrier-frame $a^{29}$, in whose free end is journaled a tool, which in the form herein shown comprises a hub $a^{30}$ and a disk or small wheel $a^{31}$, whose rounded edge is adapted to travel in the peripheral groove $a^{32}$ of the respective marking-rings, between the flanges $a^{33}$ thereof, as is clearly shown in Fig. 4. Projecting forwardly and rearwardly from the carrier $a^{29}$ are arms $a^{34}$ $a^{35}$, the latter being normally raised by a spring $a^{36}$ and the former carrying a dog or lever $a^{37}$, which when in the position shown in Fig. 3 serves to hold the wheel $a^{31}$ in accurate engagement with the ring which is being spaced and when turned down out of the position shown in Fig. 3 permits the spring $a^{36}$ to hold said wheel out of operative position.

In operation it will be understood that when it is desired to change the adjustment of the marking-rings on a spindle the latter, with its bearings, is placed in position and clamped rigidly in the machine. The card or other pattern whose lining is to be copied is then placed on the holder-bar $a^{19}$, with its right-hand edge against the stationary clamp $a^{23}$, said clamp being mounted in position corresponding to the path of the edge of paper or card as it passes through the regular ruling-machine in which the spindles are used and is clamped in said position also by the spring-clamp $a^{21}$. The spindle is kept in continuous rotation by the engagement of its gear with the gear $a^{14}$ of the main shaft. The carriage or slide $a^5$ is moved into position, so as to bring the wheel $a^{31}$ opposite to the groove $a^{32}$ of the ring which it is desired to adjust, and then the carrier $a^{29}$ is tilted forward into the position shown in Fig. 3, so as to bring the wheel into direct contact with the rotating marking-ring, as shown in Fig. 4, whereupon by turning the handle $a^{10}$ slightly one way or the other the ring is accurately and deftly adjusted along the spindle $s$ by reason of the rotation thereof and the constant sliding pressure thereon of the rotating wheel $a^{31}$. It might seem that a tightly-mounted marking-ring, such as those shown in Fig. 4, could not be slid along in this way; but experience demonstrates that they are moved with extreme ease and without any liability of injury or distortion, said movement being by imperceptible degrees, the ring being shifted to the minutest extent at any one point by the rolling contact of the wheel $a^{31}$ thereon; but because of the continuous rotation of the spindle $s$ said movement is ample for quickly moving and adjusting the rings along the spindle.

In Fig. 4 the three rings to the left are shown as adjusted, whereas the three rings to the right are to be adjusted, said adjustment being required to correspond to the card or pattern $a^{22}$, and in this connection it may be well for me to point out one great advantage of my invention, which resides in the fact that the rings may be shifted to the most minute extent and yet shifted accurately. Another advantage is that the rings having once been shifted may be trued or brought into absolutely accurate alinement, so that the marking edge of the ring is in absolutely the same plane throughout its entire periphery, simply by allowing the wheel $a^{31}$ to remain in contact with the ring during several rotations of the spindle, thereby bringing into absolute precision all points thereof.

I wish it understood that while I have shown and described a single mechanism, and that one the best embodiment of my invention at present contemplated by me, yet I do not intend to limit myself in this respect, inasmuch as I believe myself to be the first one to have provided means for accurately adjusting or shifting ring-markers or disk-like rulers longitudinally of their supporting-spindle. For instance, I prefer to rotate the spindle instead of having the wheel revolve around the spindle; but this operation might be reversed. An effort has long been made to produce a practical device of this kind; but so far as I am aware the nearest approach thereto has consisted of placing on a spindle a series of rings and corresponding series of separators, the spacing of the rings depending upon the accurate cutting of the separators to the required length for said spaces, and when a new adjustment was required the rings and separators had to be removed and new separators cut and then all reassembled upon the spindles, it being evident that the said old construction was not an adjustable device in the proper sense of the term, but merely it was a device capable of being taken apart and reconstructed. Accordingly, I intend to make certain of my claims exceedingly broad, and do not intend to limit myself otherwise than as expressed in the claims.

Having described my invention, what I claim, and desire to secure by Letters Patent, is—

1. A machine for adjusting the marking-rings on a ruling-machine spindle, comprising supports for holding the spindle whose rings are to be adjusted, mechanism for shifting said rings longitudinally of said spindle, and means for operating said mechanism.

2. A machine for adjusting the marking-rings on a ruling-machine spindle, comprising means for supporting a spindle whose rings are to be adjusted, an engaging device to engage an individual ring, said device when in engagement with said ring being free to move peripherally thereof, but not laterally thereof, mechanism for causing said engaging device to come into contact successively with said ring throughout the entire periphery thereof, and means for causing lateral pressure to be exerted upon said ring by said device.

3. A machine for adjusting the marking-rings on a ruling-machine spindle, comprising a support for receiving a spindle whose rings are to be adjusted, means for rotating said spindle, spacing mechanism movable in said machine parallel to said spindle, and having an engaging device for engaging with a ring of said spindle as the latter is rotating.

4. A machine for adjusting the marking-rings on a ruling-machine spindle, comprising a support for receiving a ruling-spindle, a copy or pattern holder adjacent thereto, and spacing mechanism for shifting the rings on said spindle into required alinement with the pattern.

5. A machine for adjusting the marking-rings on a ruling-machine spindle, comprising a support for holding a ruling-spindle, spacing mechanism for shifting the rings on said spindle, and a copy or pattern holder movable into position adjacent said spindle, said pattern-holder having means for receiving a card or pattern in position corresponding to the position occupied by a card in passing through the ruling-machine, whereby the shifting of said rings by said spacing mechanism to correspond with said pattern will cause the adjustment of said rings on said spindle in the machine to have the required adjustment for the ruling-machine.

6. A machine for adjusting the marking-rings on a ruling-machine spindle, comprising means for supporting a spindle whose marking-rings are to be adjusted, and spacing mechanism consisting of a carriage movable longitudinally on a guideway of said machine and provided with a carrier having a rotatable wheel or disk, and means for moving said wheel or disk and its carrier for engagement with the rings of said spindle.

7. In a machine for adjusting the marking-rings on a ruling-machine spindle, a support for holding a ruling-spindle in definite position, and a copy or pattern holder provided with means for indicating to the operator the lining for duplicating which the marking-rings are to be adjusted, and means for maintaining said copy or pattern holder in position to bring the lining of the copy or pattern into the same position relatively to said spindle that the matter being marked assumes when being marked by said spindle.

8. In a machine for adjusting the marking-rings on a sewing-machine spindle, a support for holding a ruling-spindle in definite position, and a copy or pattern holder provided with means for indicating to the operator the lining for duplicating which the marking-rings are to be adjusted, said holder having a stationary part mounted relatively to said spindle in a position corresponding to the path assumed by the edge of the paper or card when the latter is being ruled by a spindle in a ruling-machine, and means for mounting on said holder a card or pattern with its edge against said stationary part.

9. In a machine for adjusting the marking-rings on a ruling-machine spindle, a support for holding a ruling-spindle in definite position, and a copy or pattern holder, said holder having adjustable means for receiving patterns of different sizes which are to be copied.

10. In a machine for adjusting the marking-rings on a ruling-machine spindle, a support for holding a ruling-spindle in definite position, a copy or pattern holder, and a spring bearing against said holder and against a stationary part of the machine for maintaining the holder snugly in unvarying alinement relatively to the spindle whose rings are being adjusted.

In testimony whereof I have signed my name to this specification in the presence of two subscribing witnesses.

DAVID E. HUNTER.

Witnesses:
  GEO. H. MAXWELL,
  GEO. W. GREGORY.